US007206670B2

(12) United States Patent
Pimputkar et al.

(10) Patent No.: US 7,206,670 B2
(45) Date of Patent: Apr. 17, 2007

(54) ENERGY MANAGEMENT SYSTEM FOR CONTROLLING ENERGY SUPPLIED TO A SET OF CUSTOMER BUILDINGS

(75) Inventors: Sudheer M. Pimputkar, Worthington, OH (US); James H. Saunders, Worthington, OH (US); Joseph A. Stets, Gahanna, OH (US)

(73) Assignee: Battelle Memorial Institute, Columbus, OH (US)

( * ) Notice: Subject to any disclaimer, the term of this patent is extended or adjusted under 35 U.S.C. 154(b) by 199 days.

(21) Appl. No.: 10/957,087

(22) Filed: Oct. 1, 2004

(65) Prior Publication Data

US 2005/0102068 A1  May 12, 2005

(51) Int. Cl.
*H02J 1/00* (2006.01)
(52) U.S. Cl. ...................................... 700/291
(58) Field of Classification Search ................ 700/286, 700/291, 295–297; 323/234, 299, 304, 318
See application file for complete search history.

(56) References Cited

U.S. PATENT DOCUMENTS

| 3,906,242 | A | | 9/1975 | Stevenson |
| 4,023,043 | A | | 5/1977 | Stevenson |
| 4,075,699 | A | | 2/1978 | Schneider et al. |
| 4,217,646 | A | | 8/1980 | Caltagirone et al. |
| 4,306,293 | A | | 12/1981 | Marathe |
| 4,389,577 | A | | 6/1983 | Anderson et al. |
| 4,419,665 | A | | 12/1983 | Gurr et al. |
| 4,419,666 | A | | 12/1983 | Gurr et al. |
| 4,484,620 | A | | 11/1984 | McHugh |
| 4,510,398 | A | * | 4/1985 | Culp et al. ...................... 307/35 |
| 4,591,988 | A | | 5/1986 | Klima et al. |
| 4,639,876 | A | | 1/1987 | Deeds |
| 4,819,180 | A | | 4/1989 | Hedman et al. |
| 4,847,782 | A | * | 7/1989 | Brown et al. ................ 700/296 |
| 4,897,798 | A | | 1/1990 | Cler |
| 4,902,965 | A | | 2/1990 | Bodrug et al. |
| 4,916,328 | A | | 4/1990 | Culp, III |
| 4,977,515 | A | * | 12/1990 | Rudden et al. .............. 700/296 |
| 5,115,967 | A | | 5/1992 | Wedekind |
| 5,153,837 | A | | 10/1992 | Shaffer et al. |

(Continued)

FOREIGN PATENT DOCUMENTS

EP        0717487        6/1996

(Continued)

OTHER PUBLICATIONS

International Search Report PCT/US2003/09217.

(Continued)

*Primary Examiner*—M. N. Von Buhr
(74) *Attorney, Agent, or Firm*—MacMillan, Sobanski & Todd, LLC

(57) ABSTRACT

A method of supplying energy to a set of customer buildings having energy consuming appliances includes establishing a set of customer tolerances for conserving energy use in a set of customer buildings. A remote control system to control appliances in the customer buildings is established. At least some of the appliances in the set of buildings are controlled with the remote control system according to the customer tolerances to reduce the demand for energy.

20 Claims, 2 Drawing Sheets

U.S. PATENT DOCUMENTS

| | | | |
|---|---|---|---|
| 5,184,119 | A | 2/1993 | Stanbury et al. |
| 5,197,666 | A | 3/1993 | Wedekind |
| 5,216,623 | A | 6/1993 | Barrett et al. |
| 5,285,961 | A | 2/1994 | Rodriguez, Jr. |
| 5,404,136 | A | 4/1995 | Marsden |
| 5,414,640 | A * | 5/1995 | Seem .................. 700/291 |
| 5,479,358 | A | 12/1995 | Shimoda et al. |
| 5,502,339 | A | 3/1996 | Hartig |
| 5,543,667 | A * | 8/1996 | Shavit et al. .................. 307/39 |
| 5,544,036 | A | 8/1996 | Brown, Jr. et al. |
| 5,566,084 | A | 10/1996 | Cmar |
| 5,572,438 | A | 11/1996 | Ehlers et al. |
| 5,675,503 | A | 10/1997 | Moe et al. |
| 5,696,695 | A | 12/1997 | Ehlers et al. |
| 5,761,083 | A | 6/1998 | Brown, Jr. et al. |
| 5,897,607 | A | 4/1999 | Jenney et al. |
| 5,923,269 | A | 7/1999 | Shuey et al. |
| 5,924,486 | A | 7/1999 | Ehlers et al. |
| 5,949,232 | A | 9/1999 | Parlante |
| 6,061,609 | A | 5/2000 | Kanoi et al. |
| 6,073,169 | A | 6/2000 | Shuey et al. |
| 6,088,659 | A | 7/2000 | Kelley et al. |
| 6,098,893 | A | 8/2000 | Berglund et al. |
| 6,100,817 | A | 8/2000 | Mason, Jr. et al. |
| 6,178,362 | B1 | 1/2001 | Woolard et al. |
| 6,192,282 | B1 | 2/2001 | Smith et al. |
| 6,216,119 | B1 | 4/2001 | Jannarone |
| 6,216,956 | B1 | 4/2001 | Ehlers et al. |
| 6,263,260 | B1 | 7/2001 | Bodmer et al. |
| 6,276,438 | B1 | 8/2001 | Amerman et al. |
| 6,278,909 | B1 | 8/2001 | Thibeault et al. |
| 6,289,267 | B1 | 9/2001 | Alexander et al. |
| 6,519,509 | B1 * | 2/2003 | Nierlich et al. .............. 700/286 |
| 6,528,957 | B1 * | 3/2003 | Luchaco .................... 315/307 |
| 6,552,525 | B2 * | 4/2003 | Bessler ................... 324/103 R |
| 6,681,154 | B2 * | 1/2004 | Nierlich et al. ............. 700/286 |
| 2001/0010032 | A1 | 7/2001 | Ehlers et al. |
| 2001/0020219 | A1 | 9/2001 | Kishlock et al. |
| 2002/0130652 | A1 * | 9/2002 | Bessler ................... 324/103 R |
| 2003/0158632 | A1 * | 8/2003 | Nierlich et al. ............. 700/295 |
| 2004/0088083 | A1 * | 5/2004 | Davis et al. ................ 700/295 |
| 2006/0109134 | A1 * | 5/2006 | Aisa .......................... 340/662 |

FOREIGN PATENT DOCUMENTS

| | | |
|---|---|---|
| JP | 8-21650 | 1/1996 |
| WO | WO 99/52194 | 10/1999 |
| WO | WO 00/17984 | 3/2000 |
| WO | WO 01/06612 | 1/2001 |
| WO | WO 02/007365 | 1/2002 |

OTHER PUBLICATIONS

"Artificial intelligence and networking in integrated building management systems", authored by G. Clark et al. An Elsevier Automation in Construction Publication, dated 1997, pp. 481-498.

"Meeting New Commercial Building Survey Requirements", authored by A. Schön, Published by ASHRAE Transactions: Symposia, dated Jan. 25, 1992, pp. 1104-1109.

* cited by examiner

ENERGY MANAGEMENT SYSTEM FOR CONTROLLING ENERGY SUPPLIED TO A SET OF CUSTOMER BUILDINGS

This application claims priority from U.S. Provisional Patent Application Ser. No. 60/369190, filed Apr. 1, 2002, and entitled ENERGY MANAGEMENT SYSTEM. This application also claims priority from PCT Patent Application US2003/009217 filed Mar. 25, 2003, and entitled ENERGY MANAGEMENT SYSTEM.

TECHNICAL FIELD

This invention relates to a system for controlling the energy consumed by a multiplicity of customers. More particularly, this invention pertains to a system for communicating with energy customers to effect a reduction in peak energy demand.

BACKGROUND OF THE INVENTION

Electric energy suppliers experience variability in the demand for their product, electric energy. This variability typically reflects demands for energy brought on by temperature extremes, and time of day cycles. Invariably, the peak energy demand is at a level significantly higher than the average energy demand. To accommodate the peak energy demands, energy suppliers must spend more capital for additional energy generation equipment, or else buy additional energy as needed at peak energy rates, which are considerably higher than non-peak rates. Concurrently with efforts to provide sufficient energy at peak times of demand, energy suppliers have developed programs to reduce energy consumption by their customers. These energy reduction efforts are aimed both at overall reduction in energy consumption, such as, for example, by encouraging customers to purchase more energy efficient appliances, and at peak energy reduction, such as by establishing programs that allow the energy suppliers to disengage various customers at peak demand times to temporarily lower peak demand.

One known system for lowering peak energy demand involves disconnecting or shedding certain customer loads on a priority basis, and reconnecting them according to a scheme that takes into account the different energy demands of different types of a class of appliances. Another system includes remote control of appliances in a set of customer buildings of a energy supplier to reduce the peak energy. Another system reduces energy by a fixed percentage for each customer to manage peak load.

It would be advantageous if there could be developed an improved system for managing peak energy demands. Such a system would beneficially partially smooth out the peaks in demand, thereby enabling a more efficient use of resources.

SUMMARY OF THE INVENTION

The above objects as well as other objects not specifically enumerated are achieved by a method of supplying energy to a set of customer buildings having energy consuming appliances, the method comprising:

establishing a set of customer tolerances for conserving energy use in a set of customer buildings;

establishing a remote control system to control appliances in the customer buildings; and controlling at least some of the appliances in the set of buildings with the remote control system according to the customer tolerances to reduce the demand for energy.

According to this invention there is also provided a method of supplying energy to a set of customer buildings having energy consuming appliances, the method comprising:

establishing a set of customer preferences for conserving energy use in a set of customer buildings;

establishing a remote control system to control appliances in the customer buildings; and controlling at least some of the appliances in the set of buildings with the remote control system according to the customer preferences to reduce the demand for energy.

According to this invention there is also provided a method of supplying energy to a set of customer buildings having energy consuming appliances, the method comprising:

establishing a set of customer tolerances for conserving energy use in customer buildings, wherein the customer tolerances indicate a hierarchy of energy use for the set of customer buildings;

establishing a remote control system to control appliances in the customer buildings; and controlling at least some of the appliances in the set of buildings with the remote control system according to the hierarchy to reduce the demand for energy.

According to this invention there is also provided a method of supplying energy to a set of customer buildings having energy consuming appliances, the method comprising:

establishing a set of customer tolerances for conserving energy use in customer buildings, wherein the customer tolerances indicate a hierarchy of energy use for the set of customer buildings;

establishing a remote control system to control appliances in the customer buildings; and controlling at least some of the appliances in the set of buildings with the remote control system according to the hierarchy to reduce the demand for energy.

According to this invention there is also provided a method of supplying energy to a set of customer buildings having energy consuming appliances, the method comprising:

gathering data on physical building characteristics of the customer buildings;

gathering data on the customer tolerances for conserving energy use in the customer buildings;

establishing a remote control system to control appliances in the customer buildings;

gathering short term weather data;

determining short term future energy needs for the set of buildings based on the physical building characteristics, customer tolerances, and the short term weather data; and controlling at least some of the appliances in the set of buildings in response to the short term future energy needs to reduce the demand for energy.

According to this invention there is also provided a method of supplying energy to a set of customer buildings having energy consuming appliances, the method comprising:

gathering data on physical building characteristics of the customer buildings;

gathering data on the customer preferences for the customer buildings;

establishing a remote control system to control appliances in the customer buildings;

gathering short term weather data;

determining short term future energy needs for the set of buildings based on the physical building characteristics, customer tolerances, and the short term weather data; and controlling at least some of the appliances in the set of buildings in response to the short term future energy needs to reduce the demand for energy. appliances in the buildings.

A method of supplying energy to a set of customer buildings having energy consuming appliances, the method comprising:

gathering data on the physical building characteristics of the customer buildings;

establishing a remote control system to control appliances in the customer buildings;

gathering short term weather data;

determining with an algorithm short term future energy needs for the set of buildings based on the physical building characteristics and the short term weather data;

controlling at least some of the appliances in the set of buildings in response to the short term future energy needs to reduce the demand for energy;

gathering data on the actual use of energy for at least some of the buildings in the set of buildings; and modifying the algorithm in response to the gathered data on actual use.

According to this invention there is also provided an energy management system for supplying energy to a set of customer buildings having energy consuming appliances, the system comprising:

a remote control system to control appliances in the customer buildings;

an input device for receiving data on physical building characteristics of the customer buildings;

an input device for receiving short term weather data; and a controller including at least one data storage means for storing data on physical building characteristics, the controller being programmed with an algorithm for determining short term future energy needs for the set of buildings based on the building energy characteristics and the short term weather data;

wherein the controller is adapted to control, through the remote control system, at least some of the appliances in the set of buildings in response to the short term future energy needs.

According to this invention there is also provided a method of controlling a forced air appliance in a customer building, wherein the customer building has an existing building thermostat adapted to control the forced air appliance, and the forced air appliance has a return air system, the method comprising:

installing an appliance controller on the forced air appliance, the appliance controller being sufficient to override the existing thermostat to control the forced air appliance;

measuring the temperature in the return air system with a temperature probe connected to the appliance controller; and controlling the forced air appliance with the appliance controller in response to the temperature in the return air system.

Various objects and advantages of this invention will become apparent to those skilled in the art from the following detailed description of the preferred embodiment, when read in light of the accompanying drawings.

DETAILED DESCRIPTION OF THE INVENTION

Figure 1:
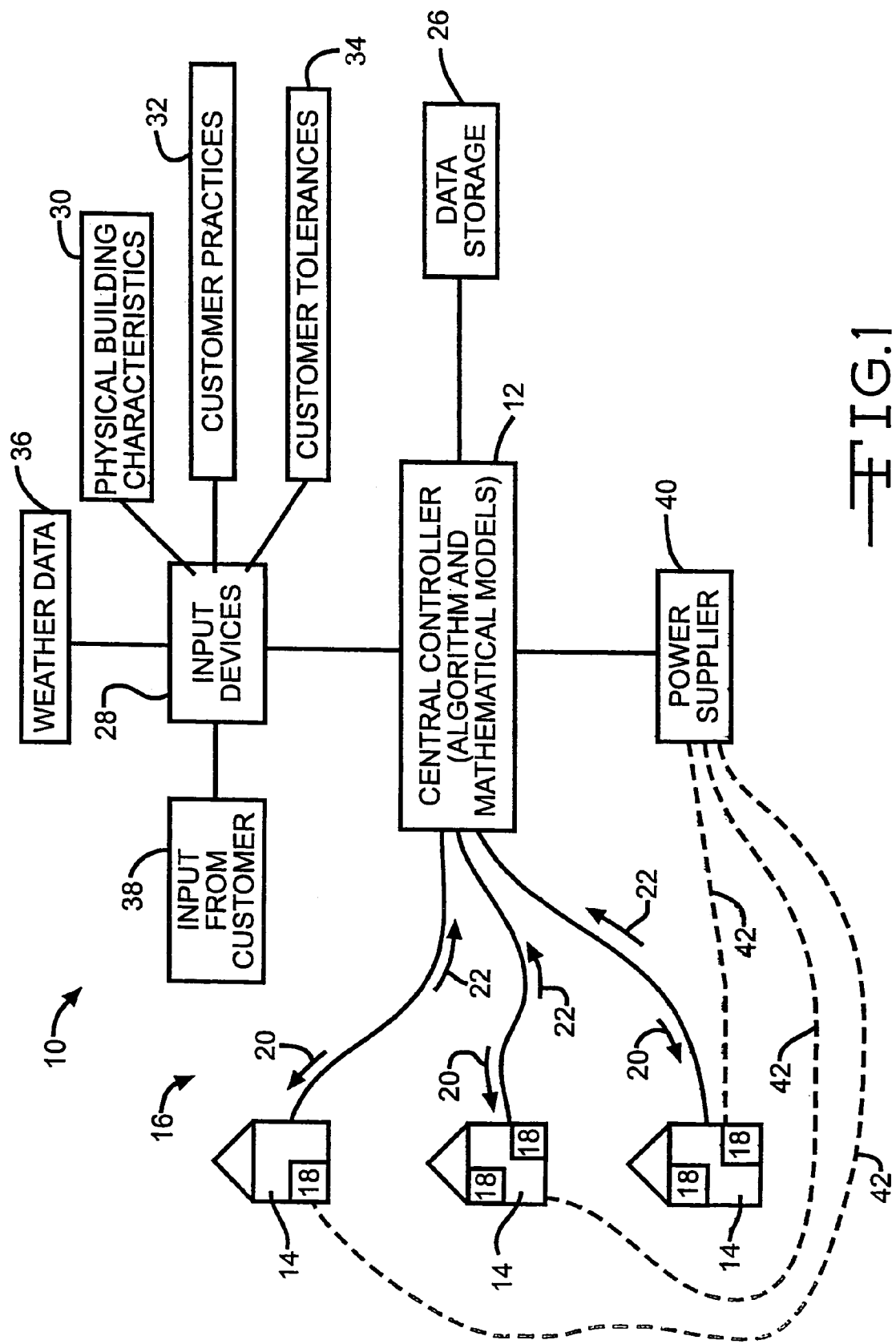
FIG. 1 is a schematic flow chart of the energy management system of the invention.

The method and system of the present invention involves a collection or set of customer buildings. Typically, the buildings are supplied through a energy distribution grid from a energy supplier, such as an electric utility. The set of customer buildings can include any number of customers and buildings, and may number as many as tens of thousands customer buildings, or more. The present invention enables the energy provider to reduce peak energy demand as opposed to purchasing peak energy on the spot market, generating peak energy, or building more base generation capacity.

The electric energy requirements for residential buildings includes electric demands from a variety of appliances, each having its own energy requirements. The term "appliances" means devices that are major energy users, including, but not limited to, electric furnaces, air conditioners, electric hot water heaters, electric clothes dryers, refrigerators and freezers, swimming pool and hot tub heaters and pumps, electric ovens and lighting. The term "appliances" also includes these kinds of devices in commercial and industrial buildings. In general, the types of appliances that consume the most electric energy are those that heat or cool air, such as electric furnaces and air conditioners. At a generally lower level of electric energy requirements are appliances that heat and cool water. Building lighting is an example of an appliance that is on an even lesser level of electricity demand.

The system and method of the present invention for supplying electric energy to a set of customer buildings having energy consuming appliances includes establishing a remote control system to control appliances in the customer buildings. The remote control system includes appliance controllers associated with each of the appliances for regulating the various appliances in the customer buildings. The appliance controllers include thermostats that regulate heating and cooling appliances, energy switches that turn appliances on and off, and light switches or rheostats that regulate lighting. The appliance controllers are connected to a central controller external of the customer buildings. This connection can be by a hardwire connection such as a phone or cable line, by wideband or wireless, such as a radio wave receiver and transmitter, or a satellite connection, or by any other type of connection. For example, the system can be configured so that the building furnace can be switched on and off using a radio frequency signal or a pager. In another example, the remote control system includes energy meters for controlling the energy being fed into the customer building. The energy meter can be configured to control the energy into the whole building, or on an appliance by appliance basis. Other configurations, such as an outlet by outlet basis or a circuit by circuit basis can be used. In operation, when a peak load is being experienced, an overall reduction in total energy demand for the set of customer buildings can be achieved by sending signals over the remote control system to the appliance controllers to regulate various appliances within the customer buildings. In a preferred embodiment of the invention, the appliance controllers include a feedback mechanism that communicates various parameters back to the central controller.

In one embodiment of the invention, data on the physical building characteristics of the customer buildings affecting energy consumption is gathered for use in the energy management system of the invention. The physical building characteristics of the customer buildings that are of interest to the method and system of the invention include the age and size of the building, existence of a basement or crawl space, furnace size and efficiency, extent of insulation and weather proofing, sun exposure, wind exposure, solar energy supplements, occupancy pattern, air conditioner size and efficiency, and existence of auxiliary appliances such as a heater for a swimming pool. An example of the usefulness of the physical building characteristics information is the fact the buildings having greater levels of insulation can be without energy longer than poorly insulated buildings before building interior temperatures deteriorate beyond comfort levels.

The physical building characteristics can be obtained from a variety of sources, including personal interviews with customers, questionnaires filled out by the customers, visual observation, and publicly available records, such as obtaining the size of the building from tax records, or determining the existence of a pool from a permitting process. Preferably, this data on the physical building characteristics is stored in a database associated with the central controller, which can be a computer. The database can be contained in a data storage means, such as an electronic memory device in or connected with the central controller.

In order to appropriately customize the expected energy load from a particular building in the set of buildings, so that short and long term peak energy can be predicted, the data on physical building characteristics can be used in conjunction with a mathematical model for the building based on classical differential equations of heat transfer and fluid mechanics. The mathematical model would consist of functional forms with some unknown coefficients. The coefficients would be obtained by matching the thoeretical solution with measured internal temperature and energy consumption data. This comparison would enable the values assigned to the initially unknown coefficients to represent specific information in which the data were measured. These coefficients would, in effect, uniquely represent the thermal characteristics of the building. This mathematical model therefore would enable the electric energy demand for each building in the set of buildings to be predicted, and also would allow the results of energy shedding to be forecast. The calculations for the mathematical model can be carried out with the central controller. It is to be understood that there does not have to be a separate mathematical model for each building, and that a mathematical model can be applied to more than one building. It is also to be understood that the algorithm could be housed in the appliance controllers in the buildings.

It is to be understood that the physical building characteristics of any particular building can be modified, and these modifications should be accounted for when the energy use predictions for the building are being made. The modifications to the physical building characteristics can be either internal or external. Examples of Internal modifications to the physical building characteristics include the replacement of original windows with new, energy-saving windows; the installation of additional insulation in the attic of the building; the replacement of a low efficiency appliance with a more energy efficient appliance; and the replacement of a dark roof with a light colored roof, which will provided more reflection of sunlight. Examples of External modifications to the physical building characteristics include the addition of a new building adjacent the building of interest, where the new building reduces the wind exposure or the sun exposure of the building in question; and the addition or deletion of shade trees that affect the sun exposure of the building.

The energy consumption of a customer building is strongly influenced by the customer practices of the customers who occupy the buildings. These customer practices relate to the energy use habits or practices of those in the building, and controlling the appliances in the building. Customer practices include decisions on setting the thermostat on a furnace or air conditioner, and decisions about when to operate an electric clothes dryer, and when to operate a dishwasher that is supplied by an electric hot water heater. Customer practices are indicative of the preferences of the customer as exhibited by everyday practice or experience. For example, one customer may set the set the thermostat to achieve an actual building temperature of 75 degrees during the air conditioning season, whereas another customer may set the thermostat to achieve an actual temperature of 80 degrees. Customer preferences/practices can be gathered from personal interviews or customer questionnaires, and could include information indicative of the customers' energy consumption habits or practices, such as the typical temperature settings (i.e., actual temperature) for heating and cooling, and the use of air conditioning continuously for the whole summer season, versus use of the air conditioning on an as needed basis. Numerous other customer practices may influence the amount of energy consumed in the buildings. Preferably, data on the customer practices is stored in the database associated with the central controller, or in any other data storage means.

Another parameter that can be used to control energy consumption is customer tolerances. In contrast to the customer practices/preferences defined above, customer tolerances is a set of limits or extreme settings for the building appliances which the customer will tolerate but not prefer. Typically, these limits are temperature limits, beyond which the customer will complain of discomfort or rebel at remaining in a voluntary energy curtailment program. For example, in the air conditioning season the customer might typically set the thermostat to achieve an actual building temperature of 80 degrees, but might be willing to accept an actual temperature of 85 degrees in times of peak energy. Another measure of customer tolerance is the willingness to be restricted in the use of certain appliances, such as a clothes dryer or a dishwasher, during restricted time periods, such as an afternoon and early evening time of peak demand. Therefore, the limits on customer appliances can be either temperature limits on the settings of appliances, or limits on the use of the appliances. The willingness of the customer to accept or tolerate a lesser degree of comfort and/or convenience is presumably incited by a reduction in rates from the energy supplier, or by an altruistic attitude toward the environment or toward the circumstances of a peak energy demand situation. The customer tolerances can be summarized as a choice between on one hand being comfortable and having the convenience of being able to use appliances at will, and on the other hand saving money and energy.

One of the ways in which energy suppliers can reduce the energy needs at times of peak demand is to temporarily curtail the energy to various customers, or to various appliances within the customer buildings. Preferably, the energy curtailment is arranged so that those customers willing to tolerate energy curtailment (presumably in return for compensation in the form of lower rates) are the customers primarily affected by such energy curtailments. According to a specific embodiment of the invention, the customer tolerances for interruption and/or external control, are assessed and used to shed energy in peak demand situations. For example, one customer may be willing to set the air conditioning thermostat at no lower than 80 degrees during times of peak electric energy demand, whereas other customers would be willing to set the thermostat at 85 degrees. The customer tolerances data can be obtained by personal or telephonic interviews, or with questionnaires, either on paper or electronically. Another method of obtaining customer tolerance data is to externally control the customer's environment, wherein the settings are established by the remote control system, until the customer provides feedback that a limit of tolerance has been reached. This communication or feedback can be indicated by use of an override switch by the customer, or by direct communication from the customer to the energy supplier, by any means such as a telephone call, hardwire connection or internet connection. The customer tolerances data can be stored in the database associated with the central controller, or in any other data storage means. The use of customer tolerances in energy shedding decision making allows the energy supplier to shed energy in a way that reduces potential customer dissatisfaction. Users with a high preference for saving money over comfort could be curtailed more and longer than users with a low tolerance for discomfort. The system is made somewhat transparent to the customer. This will help retain customers in a voluntary, peak energy reduction program.

In another specific embodiment of the invention, a forecast of local weather is obtained for use in energy shedding decision making. The weather forecast preferably includes a short term forecast of about 24 hours, and a long term forecast of about 7 days. The forecast ideally includes a prediction of the temperature, precipitation, cloud cover, wind speed, humidity, and special meteorological events such as a hurricane or an ice storm that might affect the distribution of electric energy. The forecast can be obtained from any suitable source, such as a web site, or media such as radio or television. The weather data can be stored in the database associated with the central controller, or in any other data storage means.

Once the remote control system for a set of customer buildings is in place, the physical building characteristics for the buildings have been collected and stored, the customer practices have been identified, gathered and stored, and the customer tolerances have been assessed and gathered, some or all of the appliances in the set of buildings can be controlled to reduce the demand for energy in the least disruptive manner. Preferably, the data on the customer tolerances is categorized into a hierarchy of shedding, with the most tolerant customers being shed first and the least tolerant customers being shed last. This hierarchy can be established on a customer by customer basis or, most preferably, on an appliance by appliance basis. On an appliance by appliance basis, every one of the appliances in the set of buildings would be assigned a value indicative of the rank of the appliance vis-á-vis all the other appliances for switching off the appliance or for modifying a control setting for the appliance. For example, both the air conditioner and the electric water heater of a particular building could be assigned a higher rank, i.e., subject to earlier curtailment, than the air conditioner in a neighboring building because of the lesser tolerance to curtailment by the customer in the neighboring building. Although the hierarchy is primarily based on customer tolerances, optionally, as a part of the hierarchy of energy use, the relative energy shedding value can be taken into consideration. For example, an electric furnace for a large, relatively uninsulated building consumes more energy than the furnace of a newer smaller building with good insulation. Also, it is recognized that the well insulated water heater can withstand a energy outage longer than a relatively uninsulated water heater. The controlling of the appliances to shed energy according to a customer tolerance-based hierarchy will accomplish the energy shedding with the greatest acceptance among the customers.

The central controller can be provided with an algorithm that includes the mathematical models for each of the buildings in the set of buildings. The controller monitors the conditions of the building through the remote control system, and compares the predicted energy consumption and appliance set points with the actual energy consumption and appliance set points. Data from the short term weather pattern is also incorporated into the algorithm. The controller can be adapted to modify the algorithm over time to improve the accuracy of the algorithm. For example, the controller can use data mining methods, such as neural nets, to adjust the coefficients in the algorithm, i.e., in the plurality of mathematical models, to more accurately match the measured values. The central controller can be programmed to refine the mathematical models of the algorithm over an initial calibration phase, or can be set up to periodically sample feedback data from the buildings to refine the mathematical models. The feedback can include data on the actual use of energy for at least some of the buildings in the set of buildings. Also, the central controller can be programmed to continually gather feedback from the monitors in the buildings and to continually refine the algorithm. One aspect of the refinement of the algorithm by this data mining aspect of the invention is that the data on the physical building characteristics of the customer buildings can be modified in response to the feedback data. For example, the data on the response of the customer buildings to a multiplicity of different weather conditions can be gathered and used to refine the algorithm. In such a case, the building response to a multiplicity of different weather parameters, such as, for example, temperature, humidity, wind speed, wind direction, and cloud cover, could be provided as input data and used to refine the physical building characteristics for a particular building. As a specific example, if the original physical building characteristics for a particular building included a value for the effect of wind speed on the heating operation for that building, and the actual response of the building to increased wind speed turned out to be a different value, then the physical building characteristics for the building would be modified accordingly. In general, it can be seen that the short term future energy needs can be re-determined in view of new data on responses of the building performance (building energy characteristics) to different weather conditions, or in view of new temperature feedback data.

With the algorithm calibrated, it can be used, in combination with the short term weather data, to predict energy loading over the short term, i.e., short term future energy needs. Short term is defined as about a day, such as, for example, about 24 hours or less. A threshold question is whether or not peak demand conditions exist. This can be provided as an input from an external source to the central controller. The calibrated algorithm can also be used to make energy loading predictions for longer time spans such as a week. In the event the algorithm predicts a demand that exceeds the available supply, or exceeds the supply available at an acceptable cost, the central controller can send signals through the remote control system to adjust or turn off various appliances in the set of buildings. In some cases the controlling step includes changing the settings on thermostats on some of the appliances in the buildings, and in other situations the controlling step includes turning off some appliances.

The ability to predict future load demands, i.e., short term future energy needs, enables the central controller to keep ahead of demand by shutting off or adjusting appliances ahead of the demand, i.e., prior in time. For example, in one embodiment of the invention, when it is determined that certain appliances, such as an air conditioner, must be turned off or otherwise controlled to reduce peak demand during a specific time period, the building can be pre-cooled before the peak energy demand is reached, thereby providing greater comfort for the customer during the appliance control period. Therefore, this embodiment of the invention includes predicting future load demands for a short time period, and controlling appliances prior in time to a predicted peak demand to reduce the demand for energy during the time for peak demand. The overall effect of the system and method of the invention is a truncating or reduction in the peak energy requirements for the electric energy supplier. Also, the system and method of the invention can be used to level the energy load in situations where energy cost is higher than the return for the supplier. The overall result of using the method and system of the invention is to enable a reduction in the aggregate peak energy demand in a plurality of buildings to respond to the predicted demand by controlling the appliances in those buildings in a manner consistent with the consumer tolerances associated with the building. The system can also be used as an air quality monitoring system, where air quality sensors associated with the buildings send signals to the central controller over the remote control system.

In a specific embodiment of the invention, a provision is provided for the customers to provide additional input or feedback to the energy supplier or the central controller. This feedback may be, for example, information pertaining to changes in the energy consumption expectations for the customer's building, such as a message from the customer that the water heater for the building has just been replaced with a new, energy efficient electric water heater. This feedback from the customer can be supplied via a communication module in the building that is part of the remote control network, or by electronic (such as via a energy supplier web site), paper, or telephonic means. Changes in the customer's tolerances can also be communicated to the energy supplier in the same way. The ability of the customer to provide feedback to the electric energy supplier using a data link such as any of the feedback mechanisms disclosed above will provide the customers with more control in their consumption of energy, and will assist in allowing the energy supplier to realize customized and relatively painless load curtailment.

Although the invention has been described in terms of a method and system for the distribution of electric energy, the invention can be applied to the distribution of other forms of energy, such as the distribution of natural gas. Appliances typically using natural gas in buildings include furnaces, water heaters, clothes dryers, and grills. The method and system of the invention can be used to reduce peak gas demand by controlling and/or shutting off gas appliances in the customers' buildings. The aspects of the invention pertaining to developing a hierarchy of customer tolerances, and pertaining to modifying the algorithm and/or the customer practices in response to feedback, can be applied to the distribution of other forms of energy.

The operation and system of the invention can be illustrated by referring to FIG. 1 in which the energy management system 10 includes a central controller 12. A plurality of customer buildings 14 are connected to the central controller 12 by a remote control network 16. Each of the customer buildings 14 has at least one appliance 18 controlled by the remote control network 16. The communication through the remote control network 16 includes a control function, indicated by the arrows 20 and a feedback function, indicated by the arrows 22. The central controller 12 has an associated data storage module 26, and further includes an algorithm that incorporates mathematical models associated with the buildings. The algorithms enable the central controller to determine the short term and long term future energy needs. Also associated with the central controller 12 are one or more input devices, indicated collectively at 28. The input devices are adapted to receive input from a physical building characteristics data source 30, a customer practices data source 32, and a customer tolerances data source 34. A weather data source 36 also supplies data to the controller 12 through the input device 28. Further, a customer input source 38 can be linked to the input device 28. The energy supplier 40 is linked to the controller 12 for direct communication, and is also electrically connected to the buildings 14 via energy supply lines 42.

Figure 2:
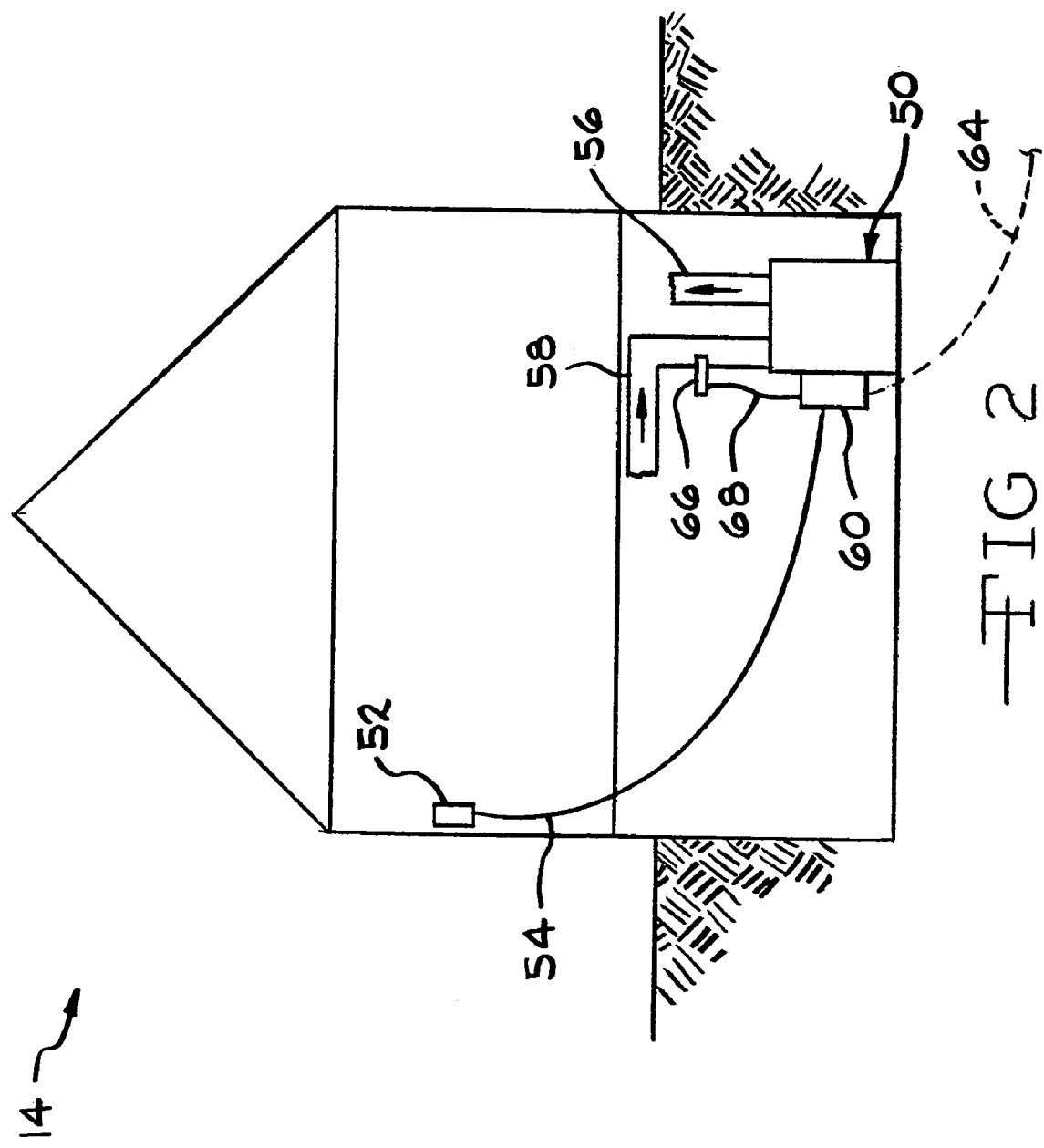
FIG. 2 is a schematic view of method of obtaining actual temperature data in a building without using a communicating thermostat.

As shown in FIG. 2, the customer building 14 includes an existing appliance, such as a gas forced air furnace 50, controlled by an existing, conventional thermostat 52. A hardwire connection 54 links the conventional thermostat 52 to the furnace 50. The furnace includes an outgoing duct 56 for conditioned air, i.e., heated air or cooled air. The furnace 50 also includes a return air system, in the form of a cold air return 58. The furnace 50 is a forced air appliance, relying on convention through gas flow to transfer heat or cooling through the building to condition the space.

An appliance controller 60 is then applied between the conventional thermostat 52 (and the thermostat wire 54) to provide an overriding control over operation of the furnace 50. The appliance controller can be any type of mechanism, preferably including a microprocessor, for providing signals to the furnace 50 to operate the furnace according to the invention to reduce peak energy demand. A remote control link 64 is part of a remote control system connecting the building 14 and the appliance controller 60 to the central controller, indicated at 12 in FIG. 1. A mechanism for measuring the temperature in the cold air return, such as a temperature probe 66, is connected to the appliance controller 60 by a temperature probe wire 68. By measuring the temperature of the air in the cold air return system, the need for a new communicating thermostat, as a replacement for the existing, conventional thermostat 52 is eliminated. Since the cost of a new communicating thermostat is approximately $180, the method of the invention makes the installation of the system of the invention less expensive than would otherwise be the case.

Although the appliance set forth in the explanation of FIG. 2 is a gas forced air furnace, it is to be understood that the appliance can also be an electric furnace, a heat pump, an air conditioner, a furnace fired by propane, a furnace fired by fuel oil, and other similar appliances.

In a specific embodiment of the invention, the central controller and/or the appliance controller are programmed to control the energy consuming appliances so that the settings are always set at the customer's tolerances. This will continually reduce the consumption of energy, both during times of peak demand and at other times.

For the embodiments of the invention disclosed above, the primary period of time for which predictions of future energy loading are made is typically about a day. In another embodiment of the invention, the period of time for which predictions are made is considerably shorter. For example, predictions of future load demands for a time period of about an hour or less can be used to control appliances prior in time to the time of a predicted peak demand to reduce the demand for energy during the time of the predicted peak demand. In yet another embodiment of the invention, the predictions of future energy demand can be for time periods as short as less than about 0.5 hours. These short time periods for energy demand may be useful in situations where the energy is being purchased on a highly fluctuating or spot market. In such a situation, it may be advantageous for the energy supplier to be able to predict peak energy use over relatively short time intervals, even as short as a 15 minute time interval.

The principle and mode of operation of this invention have been described in its preferred embodiments. However, it should be noted that this invention may be practiced otherwise than as specifically illustrated and described without departing from its scope.

What is claimed is:

1. A method of supplying energy to a set of customer buildings having energy consuming appliances, wherein the appliances, when operated, create a demand for energy, the method comprising:
   establishing a set of customer preferences for conserving energy use in a set of customer buildings;
   establishing a remote control system to control appliances in the customer buildings; and
   controlling at least some of the appliances in the set of buildings with the remote control system according to the customer preferences to reduce the demand for energy, wherein the controlling of the appliances includes predicting future load demands, including a peak demand, and controlling the appliances prior in time to the time of the predicted peak demand to reduce the demand for energy during the time of the predicted peak demand.

2. The method of claim 1 including determining whether or not peak demand conditions exist, and controlling to the appliances to reduce the demand for energy in response to peak demand conditions.

3. The method of claim 1 in which some of the appliances in the building have thermostats with settings, and in which the controlling step includes changing the settings on thermostats on some of the appliances in the buildings.

4. The method of claim 1 in which the controlling step includes turning off some appliances.

5. The method of claim 1 including predicting future load demands for a time period of less than about 24 hours, and controlling appliances prior in time to a predicted peak demand to reduce the demand for energy during the time for peak demand.

6. The method of claim 1 including:
   gathering data on physical building characteristics of the customer buildings; and
   using the physical building characteristics in controlling the appliances to reduce the demand for energy.

7. A method of supplying energy to a set of customer buildings having energy consuming appliances, wherein the appliances, when operated, create a demand for energy, the method comprising:
   establishing a set of customer tolerances for conserving energy use in customer buildings, wherein the customer tolerances indicate a hierarchy of energy use for the set of customer buildings;
   establishing a remote control system to control appliances in the customer buildings;
   gathering data on physical building characteristics of the customer buildings the physical building characteristics being the response of the building to various weather parameters; and
   controlling at least some of the appliances in the set of buildings with the remote control system according to the hierarchy, and using the physical building characteristics to reduce the demand for energy.

8. The method of claim 7 including determining whether or not peak demand conditions exist, and controlling to the appliances to reduce the demand for energy in response to peak demand conditions.

9. The method of claim 7 in which some of the appliances in the building have thermostats with settings, and in which the controlling step includes changing the settings on thermostats on some of the appliances in the buildings.

10. The method of claim 7 in which the controlling step includes turning off some appliances.

11. The method of claim 7 including predicting future load demands for a time period of less than about 24 hours, and controlling appliances prior in time to a predicted peak demand to reduce the demand for energy during the time for peak demand.

12. The method of claim 7 in which the customer tolerances are derived by gathering data using a customer survey.

13. The method of claim 7 in which the customer tolerances are derived by gathering data using the remote control system.

14. A method of supplying energy to a set of customer buildings having energy consuming appliances, wherein the appliances, when operated, create a demand for energy the method comprising:
   gathering data on physical building characteristics of the customer buildings the physical building characteristics being the response of the building to various weather parameters;
   establishing a set of customer tolerances for conserving energy use in customer buildings, wherein the customer tolerances indicate a hierarchy of energy use for the set of customer buildings;
   gathering data on the customer tolerances for conserving energy use in the customer buildings;
   establishing a remote control system to control appliances in the customer buildings;
   gathering short term weather data;
   determining short term future energy needs for the set of buildings based on the physical building characteristics, customer tolerances, and the short term weather data; and
   controlling at least some of the appliances in the set of buildings in response to the short term future energy needs to reduce the demand for energy, a basement or crawl space, furnace size and efficiency, extent of insulation and weather proofing, sun exposure, wind exposure, solar energy supplements, occupancy pattern, air conditioner size and efficiency, and existence of auxiliary appliances.

15. The method of claim 14 in which the physical building characteristics include one or more of the following: age and size of the building, existence of a basement or crawl space, furnace size and efficiency, extent of insulation and weather proofing, sun exposure, wind exposure, solar energy supplements, occupancy pattern, air conditioner size and efficiency, and existence of auxiliary appliances.

16. The method of claim 14 including the steps of modifying internal physical building characteristics of the building and determining short term future energy needs for the set of buildings by taking into account the modified physical building characteristics.

17. The method of claim 14 including the steps of modifying external physical building characteristics of the building and determining short term future energy needs for the set of buildings by taking into account the modified physical building characteristics.

18. The method of claim 14 in which the step of determining short term future energy needs for the set of buildings based on the physical building characteristics is carried out with an algorithm, and in which different weather parameters evoke different responses of the customer buildings as to short term energy needs, and further including gathering data on the response of the customer buildings to a multiplicity of different weather parameters, and modifying the algorithm in view of the response of the customer buildings to different weather parameters.

19. The method of claim 18 in which the building response to the multiplicity of different weather parameters includes responses of the buildings to changes in one or more of the following: temperature, humidity, wind speed, wind direction, and cloud cover.

20. The method of claim 14 including:
  establishing a hierarchy of energy use for the set of customer buildings on an appliance by appliance basis; and
  using the hierarchy of energy use in controlling the appliances in the buildings.

* * * * *